Feb. 8, 1955
C. W. CAIRNES ET AL
2,701,629
SHOCK ABSORBER
Filed March 12, 1954
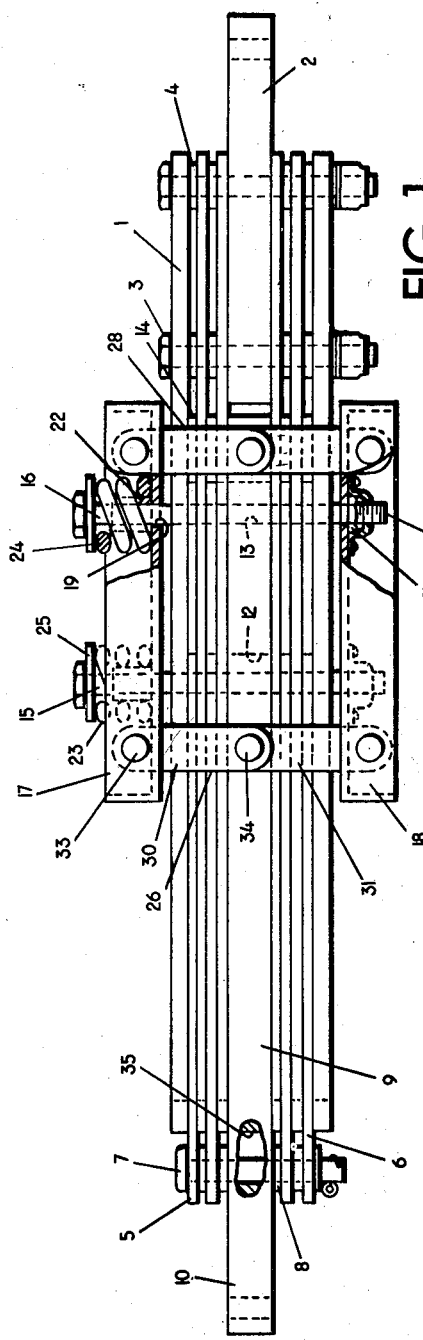
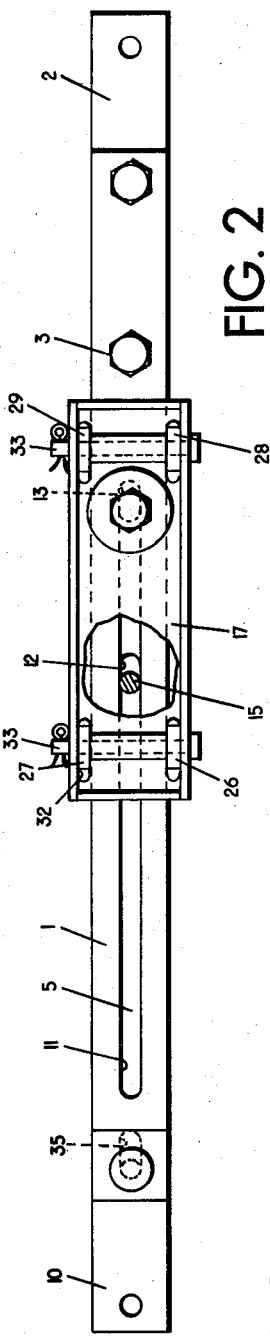
SAMUEL S. BRADY
CHARLES W. CAIRNES
*INVENTOR.*
BY *Billy G. Corken*

United States Patent Office 2,701,629
Patented Feb. 8, 1955

2,701,629

SHOCK ABSORBER

Charles W. Cairnes, Baltimore, and Samuel S. Brady, Shane, Md., assignors to Aircraft Armaments, Inc., Baltimore, Md., a corporation of Maryland Application March 12, 1954, Serial No. 415,746

7 Claims. (Cl. 188—129)

This invention relates to shock absorbers and more particularly to a mechanical friction type single action shock absorber which is capable of efficiently absorbing shock loads by offering the necessary resistance to movement in one direction while allowing free movement in the opposite direction.

Briefly, the device employs a plurality of friction plates slidable one on the other which are squeezed tightly together to absorb shock loads. A pair of brake shoes carried by one of the friction plates is arranged to force all the plates together in response to relative movement between the plates in one direction, called the snubbing stroke, and to automatically and completely remove the squeezing force in response to relative movement in the opposite direction, called the return stroke.

Conventional single action friction type shock absorbers are not capable of completely removing the squeezing force from the friction plates during the return stroke. There is merely a differential between the forces exerted by the shoes when the shock absorber is moved in opposite directions. The larger the force exerted by the shoes in a conventional single action friction type shock absorber during the snubbing stroke, the larger will be the force exerted by the shoes during the reset stroke. Thus the conventional friction type shock absorbers are not truly single action in operation. For this reason the use of mechanical friction type shock absorbers has been limited in the past to applications where double action operation is acceptable even through the mechanical type shock absorber is considerably lighter in weight than substitute devices such as the well known hydraulic type shock absorbers.

An object of this invention is to provide a mechanical type single action shock absorber having brake shoes for squeezing a plurality of friction plates together for absorbing shock loads which will automatically and completely release the friction plates in response to relative movement therebetween in one direction irrespective of the magnitude of the squeezing force normally applied by the brake shoes in response to relative movement in the opposite direction.

Another object of this invention is to provide a mechanical type single action shock absorber which is particularly well suited for use in absorbing large shock loads and which may readily be modified for operating efficiently under many other shock load conditions.

Still another object of this invention is to provide a mechanical type single action shock absorber which is dependable in operation and light in weight.

Further and other objects will become apparent from a reading of the following detail description, especially when considered in combination with the accompanying drawing in which like numerals refer to like parts.

In the drawing:

Fig. 1 is a fragmentary side elevation view of the shock absorber.

Fig. 2 is a fragmentary top elevation of the shock absorber.

Referring to Figures 1 and 2, the shock absorber includes a plurality of spaced friction plates 1 rigidly secured to an end member 2 through pins 3. Friction plates 1 extend axially beyond end member 2 and are held in the desired space relationship one above the other by means of washers 4 concentrically arranged relative to pins 3. For purposes of simplifying the description friction plates 1 will be referred to as fixed plates.

A plurality of movable friction plates 5 are interleaved between fixed plates 1 for co-axial sliding movement relative thereto for absorbing loads applied to the shock absorber. Movable plates 5 are connected together at one end 6 opposite end member 2 by means of pin 7 and are spaced apart by washers 8 so that movable plates 5 will be in alignment with the spaces provided between fixed plates 1. In this manner, plates 1 and 5 are allowed to move relative to one another without binding. As shown in Figure 1 the middle movable friction plate 9 is thicker than the other friction plates and extends beyond the end 6 thereof to provide a second end member 10.

It should be noted that opening 35 for receiving pin 7 in friction plate 9 is slotted to allow limited axial movement of plate 9 relative to the other movable friction plates for use as hereinafter described.

Fixed friction plates 1, as best shown in Figure 2, are each provided with a longitudinal slot 11 which extends throughout a major portion of the length thereof and is aligned with the slots in the other fixed plates.

Movable friction plates 5 are each provided with a pair of elongated openings 12 and 13 adjacent the forward end 14 thereof which are aligned with the longitudinal slots 11 in fixed plates 1.

Pins 15 and 16 extend through elongated openings 12 and 13 and through slots 11 for allowing only relative axial movement between the fixed and movable friction plates within the limits of slots 11.

The braking action of the shock absorber is effected by squeezing the friction plates tightly together during the snubbing stroke. This is accomplished by a pair of brake shoes 17 and 18 arranged one on either side of the friction plates to seatingly engage the outer surfaces of fixed plates 1. Brake shoes 17 and 18 are provided with openings 19 for receiving the ends of pins 15 and 16. Pins 15 and 16 are each rigidly secured at one end 20 to brake shoe 18 through lock nut assembly 21. The opposite end of pins 15 and 16 each extend through cylindrical guides 22 forming a part of brake shoe 17 to allow movement of the brake shoe in only an axial direction relative to the pins. A pair of springs 23 and 24, one for each pin 15 and 16 are concentrically arranged relative to guides 22 for reacting between brake shoe 17 and head 25 of the pins to urge the brake shoes forcefully against fixed friction plates 1 to squeeze the plurality of plates tightly together for resisting relative movement between the fixed and movable plates. The actual resistance to axial movement in terms of pounds of force is equal to the sum of the friction coefficients for the various rubbing surfaces times the force exerted by springs 23 and 24. The capacity of the shock absorber may be changed materially by simply changing the number of friction plates in the assembly. For small changes in the capacity of the shock absorber, the effective length of pins 15 and 16 may be varied to change the force exerted by springs 23 and 24.

The single action operation of the shock absorber is effected by two pair of toggle joints 26 and 27 and 28 and 29 which swingably connect with brake shoes 17 and 18 and with movable plate 9. Each toggle joint consists of a pair of levers 30 and 31, the outer ends of which project through slotted openings 32 to pivotally connect with pins 33 carried by brake shoes 17 and 18. The inner ends of levers 30 and 31 both connect with plate 9 through a common pin 34 which is spaced from elongated openings 12 and 13 such that when pins 15 and 16 are in one extreme position relative to the elongated openings, the toggle joint is in a self-locking, dead center position wherein levers 30 and 31 are nearly coaxially aligned as shown in Fig. 1, and as pins 15 and 16 move from the one extreme position relative to the elongated openings towards the other extreme position the toggle joint is moved to a shoe releasing position wherein levers 30 and 31 are out of coaxial alignment.

The length of levers 30 and 31 is such that when the toggle joint is in the self-locking position, brake shoes 17 and 18 are spread apart against the action of springs 23 and 24 to completely remove the squeezing force on the friction plates. The clearance between the brake shoes and the friction plates when the toggle joint is in the self-locking position should be in the order of 10 to 20 thousandths of an inch for best results.

In operation, starting with the shock absorber in the retracted position and with the toggle joints 26 in the self-locking position as shown in Figures 1 and 2, when a tension load is applied to the shock absorber causing the movable friction plates 6 to move relative to fixed plates 1, the inertia of the brake shoes 17 and 18 cause pins 15 and 16 to move relative to the one extreme position in elongated openings 12 and 13 and consequently rotate toggle joints 26 from the dead center position to a shoe releasing position allowing springs 23 and 24 to move shoes 17 and 18 into engagement with the friction plates, squeezing them tightly together. As the two ends of the shock absorber are pulled farther from each other, the sliding of the movable friction plates 6 relative to the fixed friction plates 1 absorbs more and more of the energy. When all the energy of the applied load is absorbed, the sliding of the friction plates cease. When the direction of movement is reversed and plate 9 of the movable friction plates begins to move towards the retracted position shown in Figures 1 and 2, the friction between brake shoes 17 and 18 and fixed plates 1 causes pins 15 and 16 to move relative to elongated openings 12 and 13 towards the one extreme position shown in the drawing wherein toggle joints 26 are in the self-locking dead center position. As the brake shoes 17 and 18 are spread apart or raised from engagement with fixed plates 1 due to the action of the toggle joints, the inertia of the brake shoes causes continued movement of the toggle joint levers 30 and 31 to the self-locking dead center position. This raising of the brake shoes occurs simultaneously with relative movement of the friction plates and is sufficiently rapid to allow releasing the friction plates with a reasonably small force such as that produced by the cushioned structure on rebound. When the brake shoes 17 and 18 are held apart by the locked toggle joints, the shock absorber will freely move to the retracted position shown in the drawing.

Slot 35 in movable plate 9 permits limited relative movement between plate 9 and the other movable plates so that only plate 9 must move relative to the fixed plates in order to actuate toggle joints 26. This materially reduces the force required to spread the brake shoes and allows changing the number of friction plates in the shock absorber without changing the force required to operate the toggle joints. Obviously, the use of slot 35 could be eliminated, especially where a small number of friction plates are employed without departing from the teachings of this invention.

Shock loads are applied to the shock absorber through end members 2 and 10 in conventional fashion. With the elongated openings 12 and 13 in the relationship with pins 34 as shown in the drawing, the snubbing action is effected when tension forces are applied to the shock absorber. By simply changing the positions of elongated openings 12, 13 and 35 relative to pins 34 and 7 so that pins 15 and 16 and pin 7 will engage the opposite end of the elongated openings when toggle joints 26 are in the self-locking, dead center position, the shock absorber will provide snubbing action when compression forces are applied. Whether snubbing action is desired during the tension or compression stroke of course depends upon the particular use of the shock absorber.

It is to be understood that certain alterations, modifications and substitutions may be made to the instant disclosure without departing from the spirit and scope of the invention as defined by the appended claims.

We claim:

1. A single action friction type shock absorber comprising, a bifurcated member providing a pair of spaced friction plates, a second member slidably received by said bifurcated member between said friction plates, said friction plates having longitudinal slots formed therein throughout a major portion of the length thereof, said second member having an elongated opening aligned with said slots, a pin extending through said slots and elongated opening and limiting the relative movement between said bifurcated member and said second member, a pair of brake shoes carried by said pin and arranged one on either side of said bifurcated member to slidably engage the outer surfaces of said friction plates, spring means carried by said pin and urging said brake shoes against said friction plates with a force sufficient to offer the desired frictional resistance to relative movement between said friction plates and said second member, a toggle joint connecting with said brake shoes and with said second member, said toggle joint being responsive to relative movement in one direction between said second member and said brake shoes within the limits of said elongated opening for moving said shoes to a raised position relative to said friction plates and to relative movement in the opposite direction releasing said shoes and allowing said spring means to force the latter into engagement with said friction plates.

2. A single action friction type shock absorber comprising, a plurality of fixed friction plates, a plurality of movable friction plates interleaved between said fixed friction plates, said fixed friction plates having aligned longitudinal slots formed therein which extend throughout a major portion of the length thereof, said movable friction plates having aligned elongated openings formed therein in alignment with said slots, a pin extending through said slots and said elongated openings and limiting the relative movement between said fixed and movable friction plates, a pair of brake shoes arranged one on either side of said friction plates for engaging the outer surfaces thereof, said brake shoes having openings formed therein for slidably receiving said pin, a coil spring concentrically arranged relative to said pin and urging said brake shoes into engagement with said friction plates whereby the latter are held in close contact with one another offering high resistance to relative movement between said fixed and movable plates and plural lever means swingably carried by said movable plates and connecting with said brake shoes for swinging movement relative thereto within the limits defined by said elongated openings from a generally aligned self-locking position holding said brake shoes in a position out of engagement with said friction plates against the action of said coil spring to an unlocked position allowing said spring means to force said brake shoes into engagement with said friction plates in response to movement of said movable plates in one direction relative to said fixed plates and from said unlocked position to said self-locking position in response to movement of said movable plates in the opposite direction relative to said fixed plates.

3. A single action friction type shock absorber comprising, a plurality of fixed friction plates, a plurality of movable friction plates interleaved between said fixed friction plates, said fixed friction plates having aligned longitudinal slots formed therein, said movable friction plates having aligned elongated openings formed therein in alignment with said slots, a pin extending through said slots and said elongated openings and limiting the relative movement between said fixed and movable friction plates, a pair of brake shoes arranged one on either side of said friction plates to engage the outer surfaces thereof, said brake shoes being carried by said pin for movement towards and away from said friction plates, spring means acting between said pin and said brake shoes for urging the latter into engagement with said friction plates whereby said fixed and movable friction plates are held in close contact with one another offering high resistance to relative movement therebetween, and a plurality of pairs of levers each arranged to form a toggle joint the outer ends of which connect with said brake shoes and the inner ends of which connect with said movable friction plates, said toggle joints being movable to and from a generally aligned self-locking position holding said brake shoes out of engagement with said friction plates against the action of said spring means in response to relative movement between said movable friction plates and said brake shoes within the limits defined by said elongated openings.

4. A single action friction type shock absorber comprising, a bifurcated member providing a pair of spaced friction plates, a second member slidably received by said bifurcated member between said friction plates, said second member having an elongated opening formed therein, a pin extending loosely through said elongated opening, a pair of brake shoes carried by said pin and arranged one on either side of said bifurcated member to slidably engage the outer surfaces of said friction plates, spring means acting between said pin and brake shoes for urging the latter into engagement with said friction plates with a force sufficient to effect pressure contact between said friction plates and said second member whereby high resistance is offered to relative movement therebetween, and a plurality of pairs of levers, each pair being arranged to form a toggle joint the outer ends of which connect with said brake shoes and the inner ends of which connect with said second member, said toggle joint being movable to and from a generally aligned self-locking position holding said brake shoes out of engagement with said friction plates in response to relative movement between said brake shoes and said second member within the limits defined by said elongated opening.

5. In a single action friction type shock absorber having a pair of friction plates slidable one on the other for absorbing shock loads, a brake shoe carried by one of said friction plates and arranged to engage the other of said friction plates on the outer surface thereof opposite said one friction plate, spring means acting between the one friction plate and said brake shoe normally forcing the pair of friction plates tightly together whereby high resistance is offered to relative movement therebetween, said brake shoe being movable relative to said one friction plate in a direction generally normal to the longitudinal axis thereof between two extreme positions, and a plurality of levers, each connecting at one end with said brake shoe and at its opposite end with said one friction plate for movement to and from a self-locking position holding said brake shoe out of engagement with said other friction plate against the action of said spring means in response to relative movement between said one friction plate and said brake shoe as effected by relative movement between said pair of friction plates.

6. A single action friction type shock absorber comprising, a plurality of fixed friction plates, a plurality of movable friction plates interleaved between said fixed friction plates, fastening means connecting said movable friction plates together at one end thereof and allowing limited axial movement of one of said movable plates relative to the remaining movable plates, said fixed friction plates having aligned longitudinal slots formed therein, said one movable friction plate having an aligned elongated opening formed therein in alignment with said slots, a pin extending through said slots and elongated opening and limiting the relative movement between said fixed and movable friction plates, a pair of brake shoes arranged one on either side of said friction plates for engaging the outer surfaces thereof, said brake shoes having openings formed therein for slidably receiving said pin and allowing only axial movement thereof relative to said brake shoes, spring means acting between said pin and brake shoes and normally urging the latter into engagement with said friction plates whereby said friction plates are held in close contact with one another offering high resistance to relative movement therebetween, and plural lever means swingably carried by said one movable plate and connecting with said brake shoes for swinging movement relative thereto within the limits defined by said elongated openings from a generally aligned self-locking position holding said brake shoes out of engagement with said friction plates against the action of said spring means to an unlocked position allowing said spring means to force said brake shoes into engagement with said friction plates in response to movement of said one movable plate in one direction relative to said fixed plates and from said unlocked position to said self-locking position in response to movement of said one movable plate in the opposite direction relative to said fixed plates.

7. A single action friction type shock absorber comprising, a plurality of fixed friction plates, a plurality of movable friction plates interleaved between said fixed friction plates, fastening means connecting said movable friction plates together at one end thereof and allowing limited axial movement of one of said movable plates relative to the remaining movable plates, said one movable friction plate having a longitudinally elongated opening formed therein, a pin extending through said elongated opening, a pair of brake shoes arranged one on either side of said friction plates for engaging the outer surfaces thereof, said brake shoes having openings formed therein for slidably receiving said pin and allowing only axial movement thereof relative to said brake shoes, spring means acting between said pin and brake shoes and normally urging the latter into engagement with said friction plates whereby said friction plates are held in close contact with one another offering high resistance to relative movement therebetween, and a plurality of pairs of levers, each pair being arranged to form a toggle joint the outer ends of which connect with said brake shoes and the inner ends of which connect with said one movable friction plate, said toggle joint being movable to and from a generally aligned self-locking position holding said brake shoes out of engagement with said friction plates in response to relative movement between said brake shoes and said one movable friction plate within the limits defined by said elongated opening.

No references cited.